United States Patent
Kawamoto (10) Patent No.: US 7,448,672 B2
(45) Date of Patent: Nov. 11, 2008

(54) SHOCK ABSORBING STRUCTURE FOR VEHICLE

(75) Inventor: Kazuhiro Kawamoto, Toyota (JP)

(73) Assignee: Kojima Press Industry Co., Ltd., Toyota-Shi (JP)

( * ) Notice: Subject to any disclaimer, the term of this patent is extended or adjusted under 35 U.S.C. 154(b) by 4 days.

(21) Appl. No.: 11/679,400

(22) Filed: Feb. 27, 2007

(65) Prior Publication Data

US 2007/0290523 A1    Dec. 20, 2007

(30) Foreign Application Priority Data

Jun. 20, 2006    (JP) .............................. 2006-170722

(51) Int. Cl.
*B60R 27/00*    (2006.01)
(52) U.S. Cl. .................. 296/187.05; 280/751; 188/377
(58) Field of Classification Search ............ 296/187.02, 296/187.05; 280/751, 752; 188/377
See application file for complete search history.

(56) References Cited

U.S. PATENT DOCUMENTS

| | | | |
|---|---|---|---|
| 5,660,426 A * | 8/1997 | Sugimori et al. ........ | 296/187.05 |
| 5,762,392 A * | 6/1998 | Suga ........................ | 296/39.1 |
| 5,992,924 A * | 11/1999 | Noritake et al. ........ | 296/187.05 |
| 6,217,061 B1 * | 4/2001 | Harland et al. ........... | 280/730.2 |
| 6,315,350 B1 * | 11/2001 | Nakane et al. ......... | 296/187.05 |
| 6,616,219 B2 * | 9/2003 | Benkler .................. | 296/187.05 |
| 6,619,727 B1 * | 9/2003 | Barz et al. .............. | 296/187.02 |
| 6,715,592 B2 | 4/2004 | Suzuki et al. .................. | 788/86 |
| 6,942,076 B2 | 9/2005 | Suzuki et al. ................ | 788/100 |
| 2005/0133324 A1 * | 6/2005 | Bailon et al. ................ | 188/377 |
| 2006/0011434 A1 | 1/2006 | Itou ........................... | 788/125 |

FOREIGN PATENT DOCUMENTS

| | | |
|---|---|---|
| JP | 11-180236 | 7/1999 |
| JP | 2001-158314 | 6/2001 |
| JP | 2001-206161 | 7/2001 |
| JP | 2004-189120 A1 | 7/2004 |

* cited by examiner

*Primary Examiner*—Dennis H Pedder
(74) *Attorney, Agent, or Firm*—Burr & Brown (57) ABSTRACT

There is provided a shock absorbing structure for a vehicle that exhibits more stable shock absorbing performance regardless of the shape of an installation space. The shock absorbing structure comprises: a plurality of shock absorbing members for absorbing an externally applied shock by being deformed by the application of the shock; and at least one connecting body each connecting adjacent ones of the shock absorbing members, wherein each of the at least one connecting body is provided with a spacer member which has a configuration corresponding to at least a part of that of a gap which is formed between each of the shock absorbing members and at least one of the vehicle interior component and the body structural component, when the plurality of shock absorbing members are installed in the installation space.

8 Claims, 4 Drawing Sheets

SHOCK ABSORBING STRUCTURE FOR VEHICLE

The present application is based on Japanese Patent Application No. 2006-170722 filed on Jun. 20, 2006, the contents of which are incorporated herein by reference.

BACKGROUND OF THE INVENTION

(1) Field of the Invention

The present invention relates to a shock absorbing structure for a vehicle, and particularly to a shock absorbing structure for a vehicle capable of being advantageously arranged in an installation space between an interior components of the vehicle and a structural component of the vehicle body.

(2) Description of the Related Art

Generally, a vehicle such as an automobile often has a shock absorbing structure fitted within an installation space between an interior component, such as a ceiling lining, a pillar garnish, a roof side rail, an instrument panel, a console box, etc., which has a high possibility of coming into contact with a vehicle occupant at a time of a collision accident, and a body structural component such as various panels constituting part of a body that are positioned at an opposite side (outer side) to the interior component side of a vehicle compartment, and in this way an impact imparted to the vehicle occupant is alleviated when the interior component contacts the vehicle occupant at the time of the collision accident, for thereby protecting the vehicle occupant.

However, many of this type of vehicle shock absorbing structures are conventionally arranged so as to fill an installation space by being designed in a shape that corresponds to the installation space between the interior component and the body structural component. As a result of this, there is no gap between the shock absorbing structure and the interior component and/or the body structural component. This arrangement prevents an occurrence of an abnormal noise caused by a contact of the shock absorbing structure with the interior component or the body structural component because of rattling caused by a vibration at a time the vehicle is traveling, for example. This arrangement also prevents the interior component from being easily dented at a time the interior component is pressed, which would otherwise give a poor or cheap impression contrary to a feeling of high quality.

Also, the shape of the installation space for the shock absorbing structure between the interior component and the body structural component is generally different for each type of vehicle, which means that with this type of conventional shock absorbing structure the overall shape should match the shape of the respective installation space, and should be designed specifically for each type of vehicle.

For this reason, at the design stage of this type of conventional shock absorbing structure, there was required an additional work to separately confirm whether or not a sufficient shock absorbing performance was exhibited by the shock absorbing structure that was designed in the shape corresponding to the installation space, which complicated the design of the shock absorbing structure and was a major cause of significantly lowering a productivity. Furthermore, with the conventional shock absorbing structure, since it is shaped in accordance with the installation space, when the installation space is comparatively large it is impossible to prevent the overall size being large. Accordingly, when the shock absorbing structure is formed by die molding using a synthetic resin material, for example, there is caused a problem that the die is increased in size, and as a result of that the manufacturing cost of the die, and also the manufacturing cost of the shock absorbing structure, rise steeply.

Under these circumstances, the inventor of the present invention proposed the shock absorbing structure for a vehicle that solves all of the various problems described above at one time, in JP-A-2004-189120. This shock absorbing structure for a vehicle has shock absorbing members that form a gap between the interior component and the body structural component, and are capable of being arranged in any of installation spaces that have different shapes from each other, and the shock absorbing structure has a spacer member, corresponding to at least a part of the gap formed between the interior component and the body structural component, attached to the shock absorbing members.

In this type of shock absorbing structure, a single general purpose member is used as the shock absorbing member regardless of the shape of an installation space in which the shock absorbing structure is fitted is changed, and as a result, even if the type of vehicle into which the structure is to be fitted changes, a stable shock absorbing performance is ensured without any troublesome design changes relating to shock absorbing characteristics. Also, the gap formed inside the installation space between the interior component and the shock absorbing member can be advantageously eliminated or made as small as possible by using the spacer member, which means that various drawbacks due to the existence of this type of gap are effectively resolved.

In this type of conventional shock absorbing structure, the spacer member is attached to the shock absorbing members via specified attachment parts. Therefore, in the case where each of the attachment parts for the spacer member provided on the shock absorbing member has an angular corner section and/or a thick-walled section, as described in JP-A-2004-189120, for example, if the corner section is large, or the thick-walled section is extremely thick, rigidity of the shock absorbing member is excessive and the shock absorbing stroke will be reduced, and as a result there is an anxiety that attainment of sufficient shock absorbing performance will be difficult. Accordingly, the conventional shock absorbing structure for a vehicle leaves room for further improvement in this respect.

SUMMARY OF THE INVENTION

The present invention has been made in light of the above described situation, and has as an object to provide an improved structure for a shock absorbing structure for a vehicle that is improved so as to exhibit a sufficient shock absorbing performance in a more stable manner while ensures an advantage of being formed in accordance with the shape of an installation space no matter what the shape of the installation space is.

In order to achieve this object, a principle of the present invention is to provide a shock absorbing structure for a vehicle to be installed in an installation space between a vehicle interior component and a body structural component of the vehicle, comprising: a plurality of shock absorbing members for absorbing an externally applied shock by being deformed by the application of the shock; and at least one connecting body each connecting adjacent ones of the shock absorbing members, characterized in that each of the at least one connecting body is provided with a spacer member which has a configuration corresponding to at least a part of that of a gap which is formed between each of the shock absorbing members and at least one of the vehicle interior component and the body structural component, when the plurality of shock absorbing members are installed in the installation space.

Namely, in the shock absorbing structure for a vehicle according to the present invention, the spacer member is located together with the shock absorbing member inside the installation space when the shock absorbing structure is installed inside the installation space. According to this arrangement, regardless of the shape of the installation space, either a gap is not formed at all between the interior component and the body structural component, or the gap is made as small as possible, and as a result various problems such as the generation of the abnormal noise and a loss of the feeling of high quality that attribute to the existence of this gap are advantageously eliminated.

In this shock absorbing structure for a vehicle, in particular, since the spacer member is attached to each of the connecting bodies that is merely integrally connecting the plurality of shock absorbing members, and is not related to the shock absorbing performance even if attachment section of the spacer member (spacer member attachment section) that has, for example, an angular corner section and/or a thick-walled section, is formed on the connecting body in order to attach the spacer member, this type of spacer member attachment section is not provided on the shock absorbing member. Therefore, differing from the conventional product, of which the spacer member is attached to the shock absorbing member, there is advantageously prevented the situation where the rigidity of the shock absorbing members is made excessive and the shock absorbing stroke is reduced because of the structure of the spacer member attachment section.

Accordingly, in the shock absorbing structure for a vehicle according to the present invention, it is possible to exhibit sufficient shock absorbing performance in a more stable manner regardless of the shape of the installation space, while maintaining the advantages obtained when the shock absorbing structure is formed in the shape corresponding to the shape of the installation space.

The present invention is preferably practiced in at least the following features.

(1) A shock absorbing structure for a vehicle to be installed in an installation space between a vehicle interior component and a body structural component of the vehicle, comprising:
  a plurality of shock absorbing members for absorbing an externally applied shock by being deformed by the application of the shock; and
  at least one connecting body each connecting adjacent ones of the shock absorbing members,
  characterized in that each of the at least one connecting body is provided with a spacer member which has a configuration corresponding to at least a part of that of a gap which is formed between each of the shock absorbing members and at least one of the vehicle interior component and the body structural component, when the plurality of shock absorbing members are installed in the installation space.

(2) The shock absorbing structure for a vehicle according to the above feature (1), wherein engaging means is further provided between each of the at least one connecting body and the spacer member, for removably engaging the each of the at least one connecting body and the spacer member to each other, and the spacer member is to be attached to the each of the at least one connecting body such that the spacer member is removable from the each of the at least one connecting body. According to this feature, in the event that the entire shock absorbing structure is formed by die molding, for example, it becomes possible to respectively form the shock absorbing members and the spacer member using separate and small-sized dies, and as a result the manufacturing costs of the dies used and of the shock absorbing structure can be made as low as possible.

(3) The shock absorbing structure for a vehicle according to the above feature (1) or (2),
  wherein each of the plurality of shock absorbing members is formed of a main body which is made of a resin; and wherein the each of the plurality of shock absorbing members includes a tubular body (16) comprising side walls each of which extends in a direction in which the shock is applied and absorbs the shock by being deformed by the application of the shock. According to this feature, at the time of receiving the shock an impact, the impact load acts on the side wall of the cylindrical section of the main body which is made of resin constituting a shock absorbing members as a compressive load in the height direction, and the side wall is subjected to buckling deformation in the height direction. As a result, the shock is more efficiently and reliably absorbed by the shock absorbing member.

(4) The shock absorbing structure for a vehicle according to any one of the above features (1)-(3),
  wherein the spacer member attached to the each of the at least one connecting body is formed of a plate member extending from the each of the at least one connecting body in a direction perpendicular to the direction in which the shock is externally applied; and
  wherein the spacer member comes into contact with the at least one of the vehicle interior component and the body structural component of the vehicle at an end portion of the spacer member, while the spacer member is installed in the installation space for the plurality of shock absorbing members. According to this feature, there is effectively prevented a deformation of the shock absorbing members due to the application of the shock by the spacer member, and various problems due to the existence of the gap between the interior component and the body structural component is advantageously prevented, while ensuring sufficient shock absorbing performance.

(5) The shock absorbing structure for a vehicle according to the above feature (4),
  wherein the spacer member formed of the plate member further includes a first engaging portion; and
  wherein the each of the at least one connecting body further includes a second engaging portion for preventing a movement of the spacer member from the end portion of the spacer member to a side where the each of the at least one connecting body is attached. According to this feature, the interior component is more reliably prevented from being dented when it is pressed etc., and there are more efficiently resolved the problems such as rattling of the interior component or the ruining of the feeling of high quality.

(6) The shock absorbing structure for a vehicle according to the above feature (4) or (5), wherein the spacer member that is formed from the plate member comes into contact with an end section of the vehicle interior component at the end portion of the spacer member, while the plurality of shock absorbing members are fixed to the body structural component, and located inside the installation space. According to this feature, for example, by taking an extending length of the spacer member into consideration, it is possible to position the end section of the interior component, in which the shock absorbing members are located between the interior component and the body structural component, so as to be pressed against another vehicle component positioned adjacent to the interior component. In this manner, the gap between the interior components and the vehicle component is advantageously eliminated or made small, and the appearance of the boundary section of the interior component and the vehicle component is advantageously improved.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DESCRIPTION OF THE PRESENT INVENTION

In order to more specifically describe the present invention, embodiments of the present invention will be described in detail below with reference to the drawings.

Figure 1:
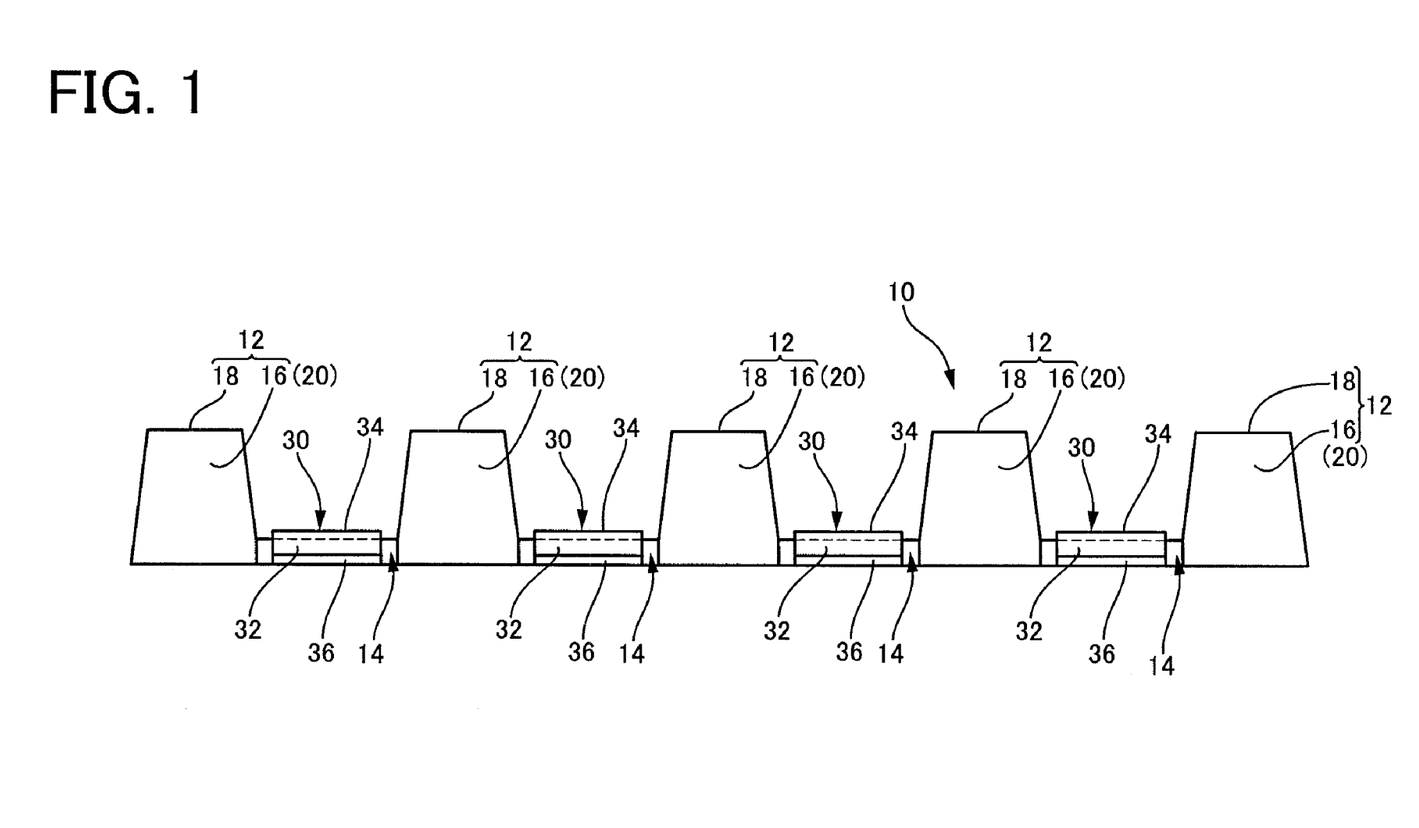
FIG. 1 is a front explanatory view showing one embodiment of a shock absorbing structure for a vehicle having a structure according to the present invention.
Figure 2:
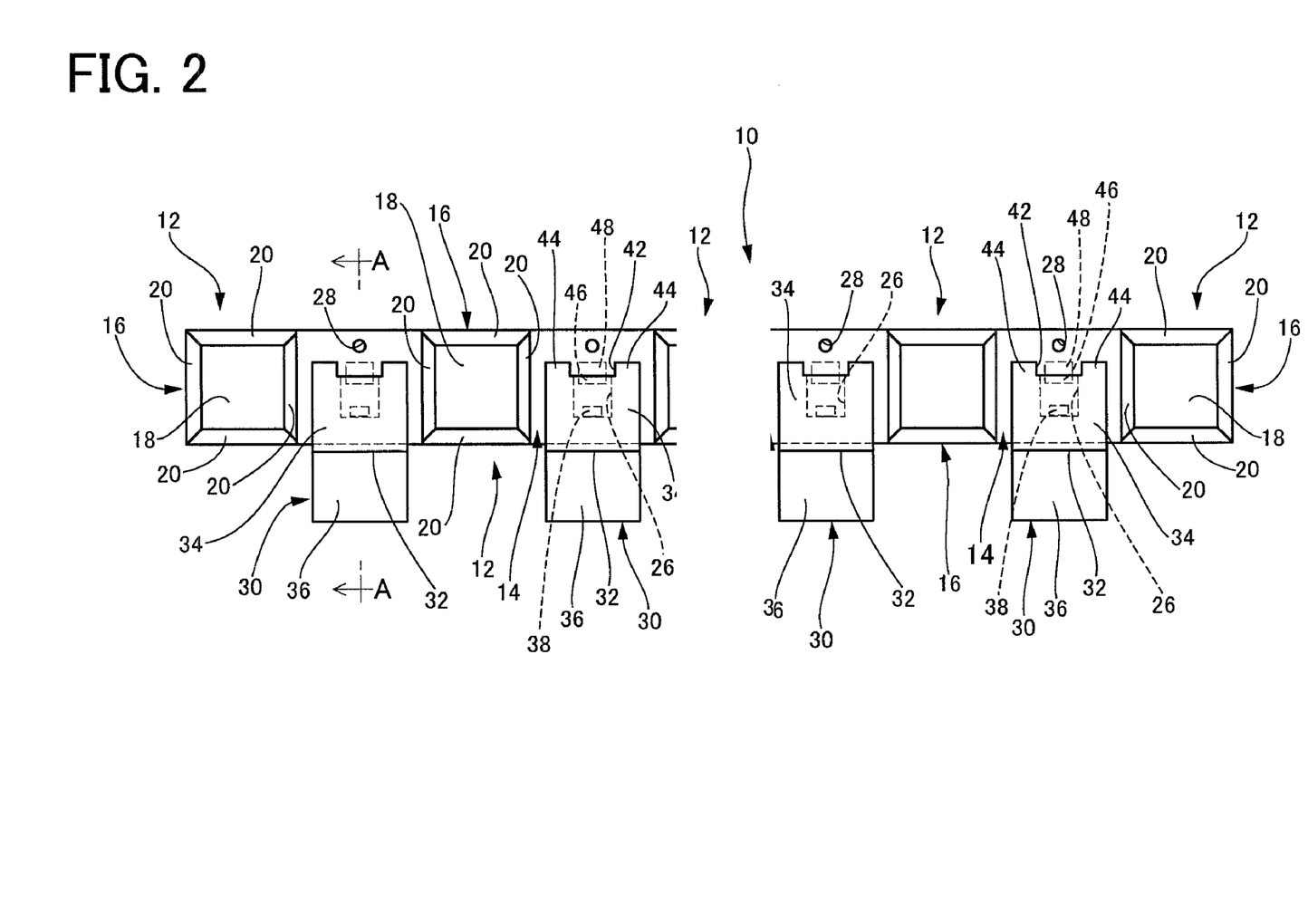
FIG. 2 is an upper explanatory view of the shock absorbing structure for a vehicle shown in FIG. 1.

First of all, FIG. 1 and FIG. 2 respectively schematically show a front appearance and upper surface appearance of a shock absorbing structure arranged in an installation space between a ceiling lining, being one type of vehicle interior component, and a roof panel, being one body structural component positioned opposing to the ceiling lining at an opposite side (rear side) to the vehicle compartment side, as one example of the shock absorbing structure for a vehicle having the structure according to the present invention. As will also be clear from these drawings, a shock absorbing structure 10 of this embodiment is constructed having a plurality of shock absorbing members 12 and a plurality of connecting bodies 14 that connect the plurality of shock absorbing members 12 to one another.

More specifically, each of the plurality of shock absorbing members 12 is formed of a tubular body 16 presenting a substantially angular cylindrical shape and a substantially rectangular top wall 18. The tubular body 16 of the shock absorbing member 12 has four side walls 20 formed as thin-walled plates presenting a substantially trapezoidal shape with an upper side being a specified dimension shorter than the lower side, and the side walls are inclined so as to gradually become closer as the side walls are closer to the axial center of the tubular body 16, and jutting up so as to extend upwards. The top wall 18 is also formed of a thin flat plate having substantially the same thickness as each side wall 20 of the tubular body 16, and is constructed by being integrated with the upper side edge section of each side wall 20 at the four edges of the top wall 18.

Specifically, here each of the shock absorbing members 12, as will be described later, in a state located within the installation space between a top portion of the ceiling lining and a roof panel arranged opposing to the top portion, is constructed as an integral component comprising the tubular body 16 having four side walls 20 erected so as to extend in the direction in which the shock is primarily applied (a shock-receiving direction or a direction in which the ceiling lining and the roof panel are opposed to each other) and the top wall 18 blocks an upper opening section of the tubular body 16 (see FIG. 4). Overall, each of the shock absorbing members 12 has an angular cylindrical shape with one end closed off having a rectangular cross sectional shape taken along a surface perpendicular to an axis of the shock absorbing member 12, and the cross sectional surface area becomes gradually smaller as the cross sectional area is closer to the tip end. Each of a plurality of these shock absorbing members 12 is independently arranged so as to be aligned in a row (in a straight line) with adjacent side walls 20 opposing to each other, keeping a specified distance apart from each other.

In this embodiment, each of the shock absorbing members 12 is formed of a synthetic resin material such as an olefin resin that is easily subjected to the buckling deformation, such as polypropylene, polyethylene, and polybutene. In this manner, the material that is easy to be subjected to the buckling deformation is used as the structural material of the shock absorbing member 12. In addition, as described above, the tubular body 16 of the shock absorbing member 12 is formed having an angular cylindrical shape that has a cross sectional surface area taken along the surface perpendicular to the axis that becomes smaller as the cross sectional surface area is closer to the tip, which means that when the shock is applied to the shock absorbing member 12 (the shock absorbing structure 10), the shock absorbing member 12 is easily deformed or buckled in the height or the axial direction of the shock absorbing member 12, while each side wall 20 of the tubular body 16 is prevented from being superposed on each other in the axial direction, as much as possible. Accordingly, in the shock absorbing member 12, even in the event that the height of each side wall 20 of the tubular body 16 is made low, and the shock absorbing stroke is made small, the impact is efficiently absorbed to at least a previously determined (designed) extent, and sufficient shock absorbing performance is ensured. Also, the size of the shock absorbing stroke, that is, the height of the shock absorbing member 12 having the tubular body 16 is either substantially the same as or slightly smaller than a distance between the ceiling lining and the roof panel, described later, where the shock absorbing member 12 is installed (see to FIG. 4).

Figure 3:
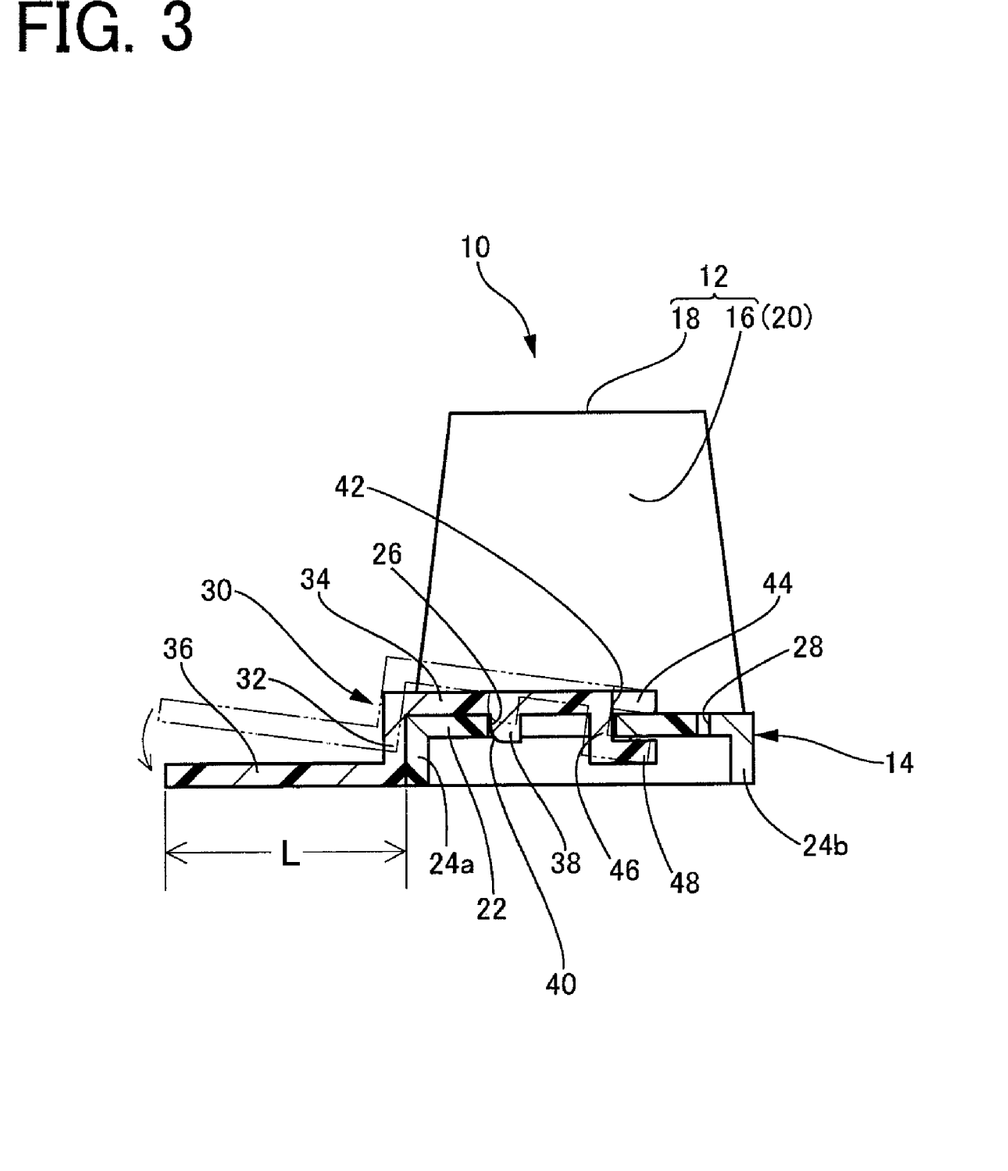
FIG. 3 is an enlarged cross sectional explanatory view taken along line A-A of FIG. 2.

The plurality of connecting bodies 14 are made using the same resin material as that of the shock absorbing member 12. Also, as shown in FIG. 1 to FIG. 3, each of these connecting bodies 14 comprises a rectangular flat plate section 22 having substantially the same width as the width of lower section of each side wall 20 of the shock absorbing member 12 and a specified length, and rectangular shaped leg sections 24a, 24b, each of which is respectively integrally formed with two edge sections positioned facing each other in a width direction of a lower surface of the flat plate sections 22 (a transverse direction in FIG. 3). Further, a rectangular engaging hole 26 is provided in a central part of the flat plate 22 of each of the connecting bodies 14 passing through the flat plate section 22 in a plate thickness direction, and a screw hole 28 is formed in the flat plate section 22 between the leg section 24b of the two leg sections 24 and the engaging hole 26.

Each of these connecting bodies 14 is arranged between an adjoining pair of the plurality of shock absorbing members 12 which are located keeping a specified distance apart from each other, with an adjoining pair of side walls 20 opposing to each other, so that each leg section 24 extends in a direction in which the pair of the side walls 20 opposing to each other. In this state each of the connecting bodies 14 is respectively combined with lower side sections of the opposed side walls 20, 20 of the adjoining shock absorbing members 12, 12 at two end sections in the length direction of the flat plate section 22.

In this way, each of adjoining pairs of the plurality of shock absorbing members 12 arranged in a line as described above are integrated by the connecting body 14, and as a result the shock absorbing structure 10 is constructed as an integrated component comprising the plurality of shock absorbing members 12 and the plurality of connecting bodies 14.

Furthermore, in the shock absorbing structure 10 of this embodiment, in particular, a spacer member 30 is respectively removably engaged to each of the plurality of connecting bodies 14.

As is clear from FIG. 2 and FIG. 3, the spacer member 30 overall is formed of a substantially rectangular shaped, a plate made of a synthetic resin material and a width of the spacer member 30 (a dimension in the transverse direction in FIG. 2) is made smaller than the length of the connecting body 14 and is sufficiently larger than the width of the engaging hole 26 provided in the flat plate section 22 of the connecting body 14, while the length of the spacer member 30 (a dimension in a vertical direction in FIG. 2) is a specified dimension larger than the width of the connecting body 14.

The spacer member 30 has a stepped section 32 provided at a central part in its length direction. The spacer member 30 is formed of two sections having the stepped section 32 therebetween, and one of the two sections is made as a support plate section 34, while the other section is made as a contact plate section 36 that is a step lower than the support plate section 34.

As will be described later, here the length of the contact plate section 36 (dimension shown by L in FIG. 3) is a dimension substantially equivalent to a distance between an inner surface of the end section of the roof lining and the outer surface of the side wall 20 of the shock absorbing member 12 facing the inner surface when the shock absorbing structure 10 is fitted into the installation space between the roof lining and the roof panel (see FIG. 4). Accordingly, the contact plate section 36 of the spacer member 30 has a configuration corresponding to at least a part of a gap formed between the shock absorbing member 12 and the roof lining. Also, difference between a height of the support plate section 34 and that of the contact plate section 36 that is corrugated at the stepped section 32 (a height from the lower surface of the contact plate section 36 to the lower surface of the support plate section 34) is the same as the height of the leg sections 24 of the connecting body 14 (a height from the lower surface of the leg section 24 to the upper surface of the flat plate section 22).

Further, an engaging protrusion portion 38 is integrally provided with the support plate section 34 of the spacer member 30 projecting from the lower surface of a central part, in the length direction, of the support plate section 34 of the spacer member 30. This engaging protrusion portion 38 comprises a small rectangular projection that is sufficiently smaller than the engaging hole 26 of the flat plate section 22 of the connecting body 14, and a tip corner closer to the contact plate section 36 side is made a curved corner section 40 constituting a convex curved surface.

Also, in the support plate section 34 a rectangular cutout 42 is provided at a central part in the width direction of the end surface opposite to the contact plate section 36 side, and two end sections remaining at either side of this cutout 42 respectively constitute upper engagers 44, 44. Further, a middle engager 46 positioned facing the engaging protrusion portion 38 and straightly extending downwardly perpendicular to the support plate section 34, and a lower engager 48 extending parallel to the support plate section 34 from the tip of the middle engager 46 towards a side opposite to the engaging protrusion portion 38 side, are integrally formed at the lower surface of a tip end section of the support plate section 34 at a side where the cutout 42 is formed.

In a state where the stepped section 32 contacts the outer surface of the leg section 24a of the two leg sections 24a, 24b of the connecting body 14 (a surface opposite to an opposed surface of the other leg section 24b), and the contact plate section 36 extends from the leg section 24a, in a direction perpendicular to the height direction of each shock absorbing member 12, straightly towards the opposite side to the other leg section 24b. The spacer member 30 having this type of structure is supported on the flat plate section 22 of each connecting body 14 at the support plate section 34. Also, in this supported state, the upper engager 44 and the lower engager 48 are vertically positioned facing each other on either side of a peripheral edge section of the engaging hole 26 of the flat plate section 22 of the connecting body 14, and the engaging protrusion portion 38 and the middle engager 46 are inserted into the engaging hole 26 so that surfaces that are opposite to the opposed surfaces of the engaging protrusion portion 38 and the middle engager 46 respectively contact sites on the inner peripheral surface of the engaging hole 26 that are opposed in the width direction of the connecting body 14.

Therefore, in the state where the contact plate section 36 extends from the leg section 24a of each of the connecting bodies 14 by a specified length in one direction perpendicular to the direction in which the shock is applied, corresponding to the height direction of each of the shock absorbing members 12, the plurality of spacer members 30 are easily removably attached to each of the plurality of connecting bodies 14. In this way, the shock absorbing structure 10 is constituted as an assembled body comprising an integrated components formed by integrally connecting a plurality of shock absorbing members 12 with a plurality of connecting bodies 14, and a plurality of spacer members 30 removably assembled on each connecting body 14 of the integrated component.

Here, in a state where the spacer member 30 is assembled (attached) to the connecting body 14, the stepped section 32 of the spacer member 30 comes into contact with an outer surface of the leg section 24a, of the two leg sections 24a and 24b of the connecting body 14, positioned at a contact plate section 36 side of the spacer member 30. For this reason, even if a force pressing the contact plate section 36 towards the support plate section 34 side acts on the contact plate section 36, relative movement between the spacer member 30 and the connecting body 14 from the contact plate section 36 side to the support plate section 34 side is prevented. As will be clear from this fact, in this embodiment a first engaging portion is constituted by the stepped section 32, and a second engaging portion is constituted by the leg section 24a of the connecting body 14.

Also, when the spacer member 30 is assembled to the connecting body 14, for example, as shown by the two-dot line in FIG. 3, at first the lower engager 48 and the upper engager 44 are positioned, sandwiching a part of a peripheral surface of the engaging hole 26 by inserting the middle engager 46 and the lower engager 48 into the engaging holes 26 of the connecting body 14 with the spacer member 30 inclined so that the contact plate section 36 is upwards. Next, with the section of the upper engager 44 that contacts the connecting body 14 as a fulcrum, the spacer member 30 is rotated downwards so that the curved corner section 40 of the engaging protrusion portion 38 slides on the inner surface of the engaging hole 26 while the engaging protrusion portion is inserted into the engaging hole 26. In this way, in a state where the upper, middle and lower engagers 44, 46, 48 and the engaging protrusion portion 38 are engaged with respective parts of the inner edge section and inner peripheral surface of the engaging hole 26 in a length direction of the spacer member 30 and the vertical direction, the spacer members 30 are assembled to the connecting body 14. Also, from this state, if the spacer member 30 is rotated upwards with the tip lower corner part of the upper engager 44 as a fulcrum, the state where the spacer member 30 is assembled to the connecting body 14 is easily released. As will be clear from these facts, the upper, middle and lower engagers 44, 46 and 48 and the engaging protrusion portion 38 provided in the spacer member 30 constitute engaging means with the engaging hole 26 provided in the connecting body 14.

Figure 4:
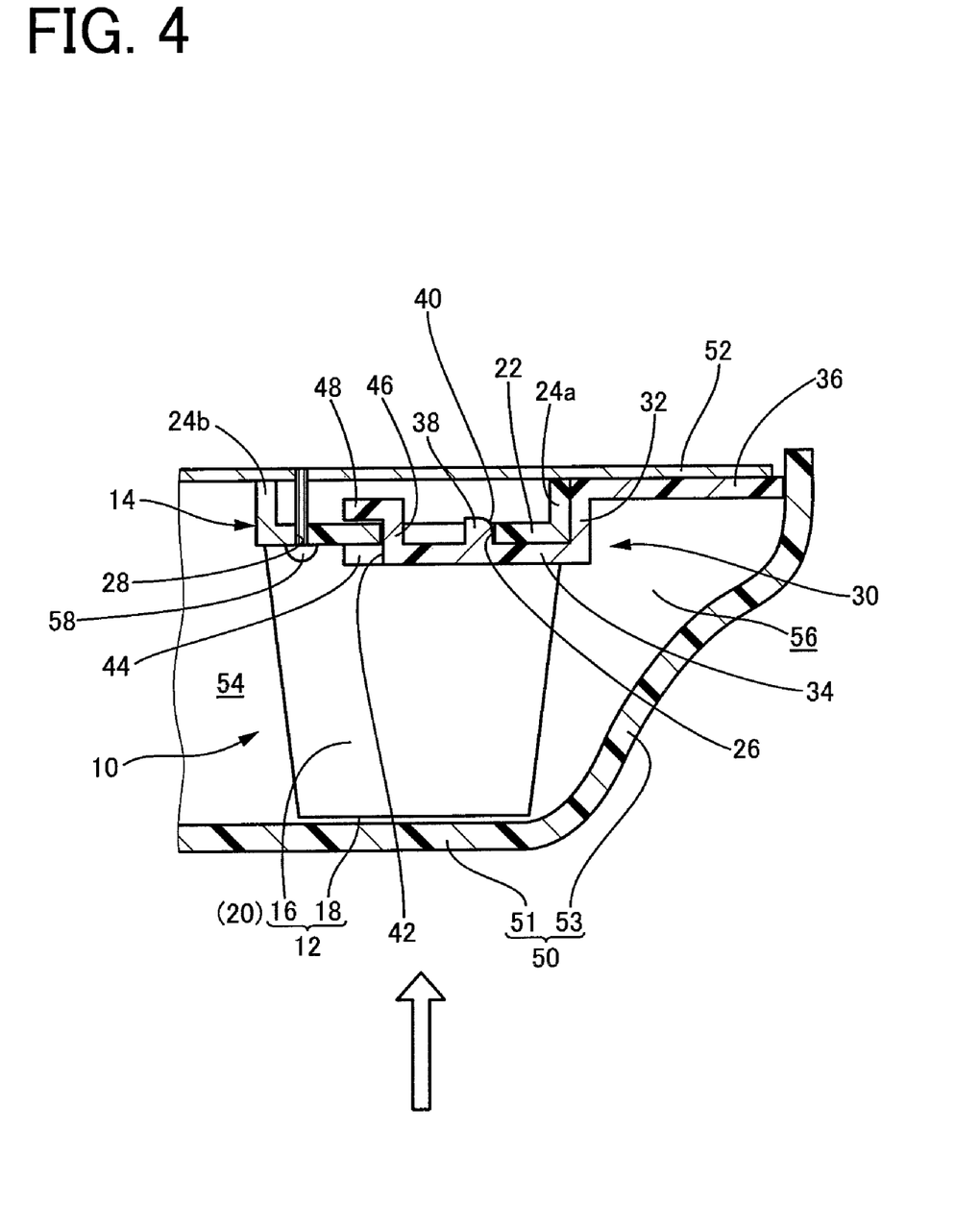
FIG. 4 is an explanatory view showing a state where the shock absorbing structure for a vehicle shown in FIG. 1 is fitted between a ceiling lining and a roof panel of the vehicle.

Therefore, the shock absorbing structure 10 of this embodiment having this type of structure, is arranged in an installation space 54 between the ceiling lining 50 and the roof panel 52 as shown, for example, in FIG. 4.

Specifically, in the installation space 54 between the ceiling lining 50 and the roof panel 52, in a state where the shock absorbing structure 10 is vertically flipped, the plurality of shock absorbing members 12 are positioned with end surfaces, that are opposite to the top wall 18, in contact with a lower surface of the roof panel 52 facing the top portion 51 of the ceiling lining 50, at an end surface of a side connecting with the connecting bodies 14. At this time, the top wall 18 of each shock absorbing member 12 is brought into contact with an inner surface (upper surface) of the top portion 51 of the ceiling lining 50 facing the roof panel 52, or positioned separate from the inner surface of the top portion 51 by a small gap. Also, each of the plurality of spacer members 30 attached to the plurality of connecting bodies 14 has the contact plate section 36 extending from the connecting body along the lower surface of the roof panel 52 towards an end section of the leg portion 53 of the ceiling lining 50, and the tip end of the contact plate section 36 is arranged in a state abutting contact with the inner surface of the end section of the leg portion 53 of the ceiling lining 50.

In this arrangement, by screwing a screw 58 inserted through the screw hole 28 provided in the flat plate section 22 of the top wall 18 into the roof panel 52, the shock absorbing structure 10 is positioned at a fixed position inside the installation space 54 between the ceiling lining 50 and the roof panel 52 in a state where the extending direction of each side wall 20 of the tubular bodies 16 of the plurality of shock absorbing members is the same as the shock-receiving direction.

Therefore, with the shock absorbing structure 10 of this embodiment, installed inside the installation space 54, when a vehicle occupant's head comes into contact with the top portion 51 of the ceiling lining 50 due to a collision accident or the like, and the shock is applied to the top portion 51 of the ceiling lining 50 in the direction of the outlined arrow in FIG. 4, each side wall 20 of the tubular bodies 16 of each shock absorbing member 12 is efficiently subjected to the buckling deformation in the height direction, and as a result sufficient shock absorbing performance is demonstrated in a stable manner.

Also, in this shock absorbing structure 10, in a state fixed to the roof panel 52 inside the installation space 54, the contact plate section 36 of each spacer member 30 is brought into contact at the tip end section thereof with the inner surface of the end section of the leg portion 53 of the ceiling lining 50, and the top wall 18 of each shock absorbing member 12 is either brought into contact with the top portion 51 of the ceiling lining 50 or positioned facing the top portion 51 leaving a small gap therebetween.

Therefore, there can be effectively prevented from giving a poor impression by being easily dented when the top portion 51 and leg portions 53 of the ceiling lining 50 are pressed etc. Also, the occurrence of rattling particularly at the end section of the leg portion 53 of the ceiling lining 50 due to a vibration at a time the vehicle is traveling is advantageously prevented. Further, for example, when the contact plate section 36 of each spacer member 30 contacts the end sections of the leg portion 53 of the ceiling lining 50 in a way that the contact plate section 36 is pressed outwards, the end sections of the leg portion 53 of the ceiling lining is brought into pressed contact with other interior components positioned nearby. As a result, the gap between the end sections of the leg portion 53 of the ceiling lining 50 and the other interior components is eliminated or made sufficiently small, and the appearance of the boundary sections between the ceiling lining 50 and the other interior components is effectively improved.

Further, in this embodiment since the spacer member 30 is attached to the connecting body 14 that is not related to the shock absorbing performance, there is absolutely no structure on each shock absorbing member 12 to attach the spacer member 30. Therefore, differing from the structure where a spacer member is attached to each shock absorbing member as disclosed, for example, in JP-A-2004-189120, there is no formation whatsoever of corner sections or thick-walled sections that are squared off in order to attach the spacer member to each shock absorbing member 12, which may excessively increase the rigidity of each shock absorbing member 12 or reduce the shock absorbing stroke.

Accordingly, in this type of shock absorbing structure 10 of this embodiment, for example, simply by making various changes to the length of the contact plate section 36 of each spacer member 30, sufficient shock absorbing performance is much more stably ensured regardless of the size of a gap 56 between each shock absorbing member 12 and the ceiling lining 50 inside the installation space, there can be highly advantageously prevented spoiling of the feeling of high quality of the ceiling lining or the occurrence of the rattling attributable to the existence of the gap 56 between each shock absorbing member 12 and the ceiling lining 50, and there can be effectively improved the appearance of a boundary section between the ceiling lining 50 and the other interior component.

Also, this shock absorbing structure 10 is constructed with an integral component comprising the plurality of shock absorbing members 12 and the plurality of connecting bodies 14, to which a plurality of separately formed spacer members 30 are attached. Therefore, in the event that the whole of the shock absorbing structure is made by die molding, the integral component comprising the shock absorbing members 12 and the connecting bodies 14, and each of the spacer members 30, can be formed using separate molds, and as a result there can be used small and inexpensive items as those molds. As a result, the manufacturing cost of the shock absorbing structure 10 is kept as low as possible.

Further, in this embodiment, as well as that the spacer member 30 is formed of a plate member, the contact plate section 36 formed of a part of the spacer member 30 extends from the connecting body 14 in a direction perpendicular to the shock-receiving direction, and the tip end section of the contact plate section 36 is positioned in contact with the end section of the ceiling lining 50, so that there is effectively prevented a situation where the spacer member 30 hinders the deformation of each shock absorbing member 12 due to the application of the shock, and as a result there can be stably assured the sufficient shock absorbing performance. Also, in addition to be able to make the spacer member 30 small in size and lightweight, there can be advantageously realized reduction of the size of the manufacturing equipment used in the manufacture of this type of spacer member 30, such as molds, and also realized the reduction of the cost.

Also, in this embodiment, in a state where the spacer member 30 is attached to the connecting body 14, by positioning the stepped section 32 of the spacer member 30 in contact with the leg section 24a of the connecting body 14, a relative movement between the spacer member 30 and the connecting body 14 from the contact plate section 36 side of the spacer member 30 to the support plate section 34 side is prevented, which means that the ceiling lining 50 is more reliably prevented from being dented when the end section of the ceiling lining 50 positioned in contact with the contact plate section of the spacer members 30 is pressed. The rattling of the end of the ceiling lining 50 is also more effectively eliminated.

While the presently preferred embodiment of this invention has been described in detail, for illustrative purpose only, it is to be understood that the present invention is not limited to the details of the illustrated embodiment, but may be otherwise embodied.

For example, the number of the shock absorbing members 12 is not limited at all as long as the number is plural, and can be appropriately changed depending on the size of the installation space 54 or the size of the shock absorbing members 12 themselves, etc. Obviously the shape of the shock absorbing member is also not particularly limited.

The constitution of the shock absorbing members 12 can also be appropriately changed as long as the shock is still absorbed by being deformed when the shock is outwardly applied. Accordingly, as disclosed, for example, in JP-A-2004-189120, the shock absorbing member 12 has a shape that is smaller than any of various installation spaces that differ in size depending on the types of the vehicle interior component and the body structural component, so as to have a structure such that the shock is absorbed to at least a predetermined extent by being installed in any of these various sized installation spaces leaving the gap between the vehicle interior component and the body structural component, and by being deformed as a result of the outwardly applied shock. In this type of structure, it is possible to use a single general-purpose shock absorbing member for any shape of installation space. This shock absorbing structure therefore eliminates the need to carry out additional work in order to individually ascertain, at the design stage whether or not the shock absorbing member will exhibit the sufficient shock absorbing performance when respectively fitted into the various sized installation spaces.

Further, well known rib structures or various well-known structures for absorbing the shock formed by using a material other than the synthetic resin material can also be adopted as the shock absorbing member 12.

Still further, in the above described embodiment, the spacer member 30 is formed of the plate member having a shape according to the part of the gap 56 formed between the ceiling lining 50 and the shock absorbing member 12, but the spacer member may, for example, have a solid structure other than the plate shaped arrangement corresponding to the whole or a part of the gap 56, as disclosed in JP-A-2004-189120.

Also in the event that the spacer member 30 is made of the plate member, the overall or partial shape of the spacer member 30 and the direction of the extension of the spacer member 30 from the connecting body 14 etc. are not limited at all.

There is also no absolute necessity for the spacer member 30 to be attached to each of the plurality of connecting bodies 14. The attachment position of the spacer member 30 to the connecting body 14 is also not particularly limited.

Still further, the attachment structure of the spacer members 30 to the connecting body 14 is not limited to the illustrated manner, and depending on the situation the spacer member 30 may have an integrated formation with the connecting body 14 such that the spacer member 30 cannot be removed from the connecting body 14. Incidentally, in the event that the engaging means for removably engaging the spacer members and the connecting body is provided between the spacer member and the connecting body, this engaging means can also be constructed using a member that is independent of the spacer member and the connecting body.

The structure of the connecting body 14 can also have any configuration provided that the connecting body can connect the plurality of shock absorbing members.

In addition, while the illustrated embodiment of the invention has the structure arranged for the installation space 54 between the ceiling lining 50 and the roof panel 52 of the vehicle, it is to be understood that the present invention can also be advantageously applied to a shock absorbing structure arranged in an installation space between the vehicle interior components other than the ceiling lining and the body structural component positioned opposite to the vehicle compartment side of the interior component, or applied to a shock absorbing structure arranged in a vehicle other than an automobile.

It is to be understood that the present invention may be embodied with various modifications, corrections and improvements by one skilled in the art, and it goes without saying that these types of additional aspects are included in the range of the present invention as long as they do not deviate from the scope of the present invention.

What is claimed is:

1. A shock absorbing structure for a vehicle to be installed in an installation space between a vehicle interior component and a body structural component of the vehicle, comprising:
   a plurality of shock absorbing members for absorbing an externally applied shock by being deformed by the application of the shock; and
   at least one connecting body connecting adjacent shock absorbing members,
   wherein the at least one connecting body is provided with a spacer member which is formed separately from the connecting body and the shock absorbing member and which has a configuration corresponding to at least a part of a gap which is formed between each of the plurality of shock absorbing members and at least one of the vehicle interior component and the body structural component, when the plurality of shock absorbing members are installed in the installation space, wherein the spacer member includes a contact section that extends from the connecting body and a tip end of the contact section contacts at least one of the vehicle interior component and the body structural component of the vehicle, and engaging means is provided for engaging the at least one connecting body and the spacer member to each other.

2. The shock absorbing structure for a vehicle according to claim 1,
   wherein the engaging means provided between the at least one connecting body and the spacer member removably engages the at least one connecting body and the spacer member to each other.

3. The shock absorbing structure for a vehicle according to claim 1, wherein each of the plurality of shock absorbing members is formed of a main body which is made of a resin; and wherein the each of the plurality of shock absorbing members includes a tubular body comprising side walls each of which extends in a direction in which the shock is applied and absorbs the shock by being deformed by the application of the shock.

4. The shock absorbing structure for a vehicle according to claim 1, wherein the spacer member attached to the at least one connecting body is formed of a plate member and extends from the at least one connecting body in a direction perpendicular to the direction in which the shock is externally applied; and wherein the spacer member comes into contact with at least one of the vehicle interior component and the body structural component of the vehicle at an end portion of the spacer member, when the spacer member is installed in the installation space for the shock absorbing structure.

5. The shock absorbing structure for a vehicle according to claim 4, wherein the spacer member formed of the plate member further includes a first engaging portion; and wherein the at least one connecting body further includes a second engaging portion for preventing a movement of the spacer member from the end portion of the spacer member to a side where the at least one connecting body is attached.

6. The shock absorbing structure for a vehicle according to claim 4, wherein the spacer member is in contact with an end section of the vehicle interior component at the end portion of the spacer member, when the plurality of shock absorbing members are fixed to the body structural component, and installed in the installation space.

7. The shock absorbing structure for a vehicle according to claim 1, further comprising a fixing member that fixes each of the plurality of shock absorbing members to the body structural component of the vehicle and the position of the fixing member on the connecting body is different from the position where the spacer member is attached.

8. The shock absorbing structure for a vehicle according to claim 1, wherein the tip end of the contact section of the spacer is in contact with the vehicle interior component and the body structural component when the shock absorbing structure is installed in the installation space.

\* \* \* \* \*